(12) United States Patent
Okochi et al.

(10) Patent No.: US 7,150,940 B2
(45) Date of Patent: Dec. 19, 2006

(54) LITHIUM ION SECONDARY BATTERY

(75) Inventors: Masaya Okochi, Osaka (JP);
Masatoshi Nagayama, Hirakata (JP);
Yutaka Kawatate, Hirakata (JP);
Ryoichi Tanaka, Izumiotsu (JP);
Hideya Asano, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 512 days.

(21) Appl. No.: 10/469,134

(22) PCT Filed: Oct. 21, 2002

(86) PCT No.: PCT/JP02/10893

§ 371 (c)(1),
(2), (4) Date: Aug. 27, 2003

(87) PCT Pub. No.: WO03/038931

PCT Pub. Date: May 8, 2003

(65) Prior Publication Data

US 2004/0072073 A1 Apr. 15, 2004

(30) Foreign Application Priority Data

Oct. 29, 2001 (JP) ............... 2001-330970

(51) Int. Cl.
*H01M 4/52* (2006.01)
*H01M 4/58* (2006.01)
*H01M 4/62* (2006.01)

(52) U.S. Cl. .................. 429/231.3; 429/217; 429/223; 429/231.6; 429/231.8

(58) Field of Classification Search ................ 429/217, 429/223, 231.3, 231.6, 231.8, 337
See application file for complete search history.

(56) References Cited

U.S. PATENT DOCUMENTS

| 5,538,814 | A | * | 7/1996 | Kamauchi et al. ... 429/231.8 X |
| 6,274,272 | B1 | | 8/2001 | Peres et al. |
| 6,368,749 | B1 | * | 4/2002 | Yanai et al. ......... 429/231.6 X |
| 6,756,155 | B1 | * | 6/2004 | Kweon et al. ....... 429/231.6 X |
| 2002/0037456 | A1 | | 3/2002 | Hosoya |

FOREIGN PATENT DOCUMENTS

| JP | 5-54889 | 3/1993 |
| JP | 3162437 | 3/1993 |
| JP | 5-242891 | 9/1993 |
| JP | 9-168722 | 6/1994 |
| JP | 7-226201 | 8/1995 |
| JP | 8-185863 | 7/1996 |
| JP | 09-171816 | 6/1997 |

(Continued)

OTHER PUBLICATIONS

English translation of JP 09-274920, from the Japanese Patent Office website (document date Oct. 1997).*

(Continued)

*Primary Examiner*—Stephen J. Kalafut
(74) *Attorney, Agent, or Firm*—McDermott Will & Emery LLP

(57) ABSTRACT

A lithium ion secondary battery comprising a positive electrode, a negative electrode and a non-aqueous electrolyte, wherein the positive electrode comprises a positive electrode active material, a conductive agent and a binder, the positive electrode active material comprises a lithium-containing composite oxide represented by the formula $Li_a(Co_{1-x-y}Mg_xM_y)_bO_c$, where M is at least one selected from Ni and Al, $0 \leq a \leq 1.05$, $0.03 \leq x \leq 0.15$, $0 \leq y \leq 0.25$, $0.85 \leq b \leq 1.1$ and $1.8 \leq c \leq 2.1$, and the amount of the conductive agent contained in the positive electrode is not more than 3.0 parts by weight per 100 parts by weight of the positive electrode active material.

5 Claims, 1 Drawing Sheet

FOREIGN PATENT DOCUMENTS

| | | |
|---|---|---|
| JP | 9-231973 | 9/1997 |
| JP | 9-274920 | 10/1997 |
| JP | 11-16570 | 1/1999 |
| JP | 11-045706 | 2/1999 |
| JP | 11-86845 | 3/1999 |
| JP | 2000-113890 | 4/2000 |
| JP | 2000-264614 A | 9/2000 |
| JP | 2000-268878 A | 9/2000 |
| JP | 2000-306582 A | 11/2000 |
| JP | 2001-283831 A | 10/2001 |
| JP | 2001-319652 | 11/2001 |
| JP | 2002-083630 A | 3/2002 |
| JP | 2002-110232 A | 4/2002 |
| JP | 2002-141109 A | 5/2002 |
| JP | 2002-246027 | 8/2002 |

OTHER PUBLICATIONS

English translation of JP 11-016570, from the Japanese Patent Office website (document date Jan. 1999).*

English translation of JP 11-086845, from the Japanese Patent Office website (document date Mar. 1999).*

H. Tsukamoto et al., "Electronic Conductivity of LiCoO2 and its Enhancement by Magnesium Doping", J. Electrochem. Soc., Sep. 1997, vol. 144, No.9, pp. 3164-3168.

* cited by examiner

LITHIUM ION SECONDARY BATTERY

TECHNICAL FIELD

The present invention relates to lithium ion secondary batteries.

BACKGROUND ART

Recently, portable, cordless consumer electronic appliances are being rapidly developed. At present, there is an increasing demand for compact, lightweight batteries with high energy density as power sources for these electronic appliances. In particular, a growing market share is expected for lithium ion secondary batteries as power sources for notebook PCs, cellular phones, AV equipment and the like, since they have high energy density and high voltage. Nickel-cadmium storage batteries or nickel-metal hydride storage batteries using an alkaline aqueous solution as the electrolyte, which have been the mainstream, are being replaced with lithium ion secondary batteries.

As positive electrode active materials of lithium ion secondary batteries, lithium-containing composite oxides such as $LiCoO_2$, $LiNiO_2$, $LiMnO_2$ and $LiMn_2O_4$ are used. These positive electrode active materials undergo repeated expansion and contraction when subjected to charge and discharge. At this time, destruction of the crystal structure or cracking of the particles is caused, resulting in a decrease in capacity or an increase in internal resistance during charge/discharge cycles. In response to this problem, it has been reported that the crystal structure is stabilized by partly replacing cobalt or nickel with other elements.

For example, it has been reported in Japanese Patent No. 3162437, Japanese Unexamined Patent Publication Nos. Hei 5-242891 and Hei 6-168722 that the cycle characteristics and the safety are improved by partly replacing cobalt in the positive electrode active material with an element such as magnesium. However, while the deterioration of the cycle characteristics can be suppressed, it has been confirmed that when, for example, a charged battery is stored at 85° C. for three days, the amount of gas generated in the battery is relatively larger. Particularly, in square thin batteries and batteries having an outer jacket made of a laminated sheet, the strength of the case or outer jacket is low, so that the gas generation may lead to an increase in thickness and a decrease in capacity of the batteries. Although the cause of the increase in the amount of gas generation is uncertain at the moment, it is believed that since a positive electrode active material in which cobalt is partly replaced with magnesium has high electronic conductivity and the surface of the active material is active, its reactivity with a non-aqueous electrolyte increases, promoting decomposition of the non-aqueous electrolyte.

DISCLOSURE OF INVENTION

The present invention relates to a lithium ion secondary battery comprising a positive electrode, a negative electrode and a non-aqueous electrolyte, wherein the positive electrode comprises a positive electrode active material, a conductive agent and a binder, the positive electrode active material comprises a lithium-containing composite oxide represented by the formula $Li_a(Co_{1-x-y}Mg_xM_y)_bO_c$, where M is at least one selected from Ni and Al, $0 \leq a \leq 1.05$, $0.03 \leq x \leq 0.15$, $0 \leq y \leq 0.25$, $0.85 \leq b \leq 1.1$ and $1.8 \leq c \leq 2.1$, and an amount of the conductive agent contained in the positive electrode is not more than 3.0 parts by weight per 100 parts by weight of the positive electrode active material.

It is preferable that the amount of the binder contained in the positive electrode is not less than 1.0 part by weight and not more than 4.0 parts by weight per 100 parts by weight of the positive electrode active material.

It is preferable that the binder comprises polyvinylidene fluoride, and a weight-average molecular weight of the polyvinylidene fluoride is not less than 150000 and not more than 350000.

It is preferable that the non-aqueous electrolyte comprises a non-aqueous solvent and a lithium salt dissolved in the non-aqueous solvent, and the non-aqueous solvent contains γ-butyrolactone and/or a γ-butyrolactone derivative.

It is preferable that the negative electrode contains a material comprising core particles and amorphous carbon coating at least a portion of a surface of the core particles, and the core particles comprise graphite.

According to the present invention, it is possible to provide a lithium ion secondary battery in which a decrease in capacity is suppressed during high-temperature storage, as well as during charge/discharge cycles.

BEST MODE FOR CARRYING OUT THE INVENTION

Figure 1:
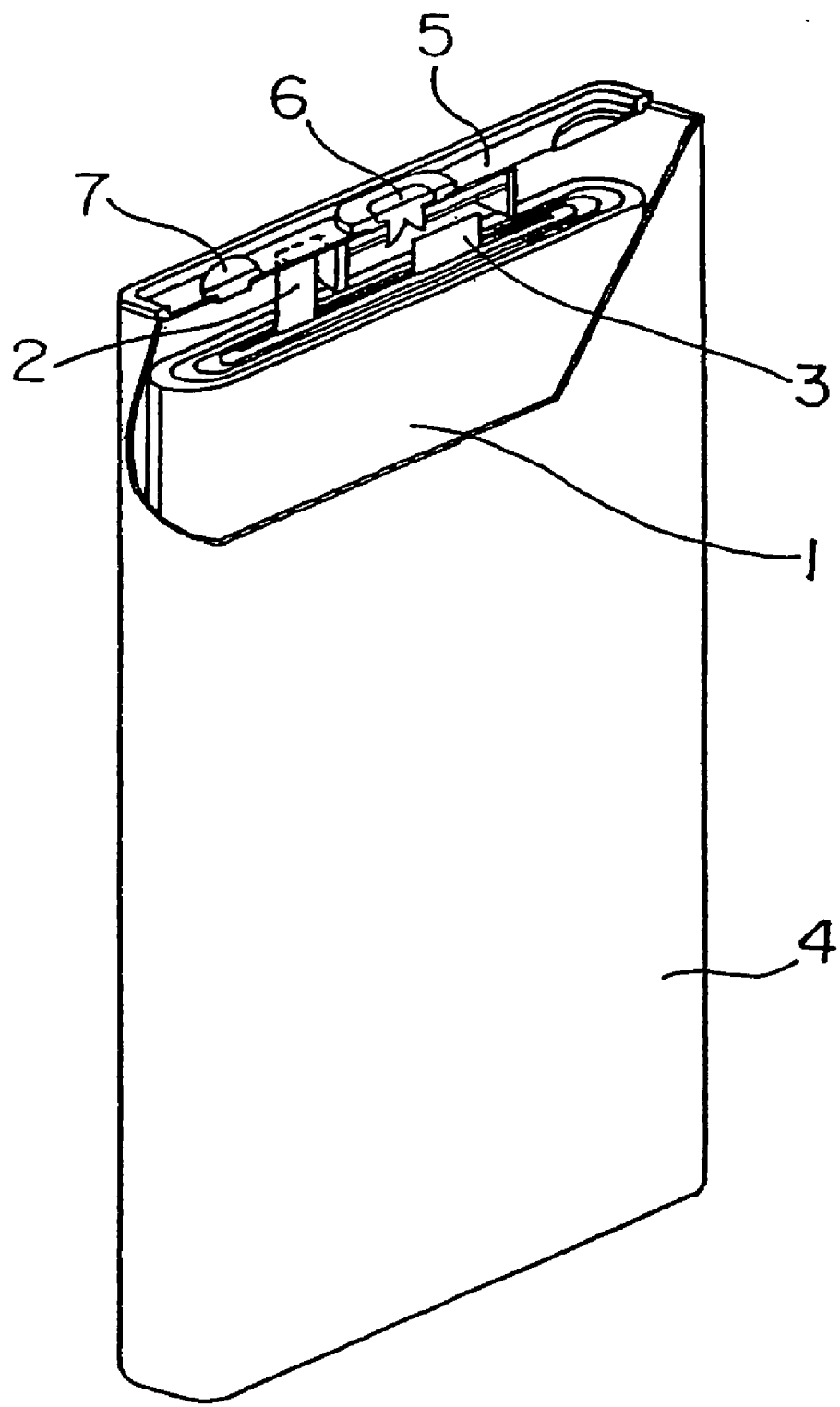
FIG. 1 is a partially cut-away oblique view of a square battery of an example in accordance with the present invention.

The present invention employs a positive electrode active material comprising a lithium-containing composite oxide represented by the formula $Li_a(Co_{1-x-y}Mg_xM_y)_bO_c$, where M is at least one selected from Ni and Al, $0 \leq a \leq 1.05$, $0.03 \leq x \leq 0.15$, $0 \leq y \leq 0.25$, $0.85 \leq b \leq 1.1$ and $1.8 \leq c \leq 2.1$.

In the crystal of the above-described composite oxide, cobalt is partly replaced with magnesium. For this reason, the crystal structure is stable and destruction of the crystal structure or cracking of the particles tends not to occur during charge/discharge cycles. Accordingly, a decrease in capacity of the battery is suppressed, improving the cycle life.

When the content 'x' of magnesium is less than 0.03, the crystal structure of the composite oxide cannot be sufficiently stabilized. Therefore, the internal resistance is increased by repeated charge and discharge, resulting in a significant deterioration of the cycle characteristics. On the other hand, when the content "x" is more than 0.15, the charge/discharge capacity of the positive electrode active material decreases. From this, it is required that the content "x" of Mg satisfy $0.03 \leq x \leq 0.15$.

The above-described composite oxide can contain, as an element M, at least one selected from Ni and Al. A composite oxide containing Ni can be obtained at low cost and improves the heat resistance. On the other hand, a composite oxide containing Al improves the heat resistance and provides further improved cycle characteristics. However, when the content "y" of the element M is more than 0.25, the following disadvantages occur. That is, when there is too much Ni, the deterioration of the cycle life characteristics or the amount of gas generated during high-temperature storage increases. When there is too much Al, on the other hand, the charge/discharge capacity of the active material decreases or the tap density of particles of the active material decreases, reducing the capacity of the electrode plate. From this, it is required that the content "y" of M satisfy $0 \leq y \leq 0.25$.

The above-described positive electrode active material can be obtained, for example, by baking a lithium salt, a magnesium salt and a cobalt salt at a high temperature in an oxidizing atmosphere. As starting materials for synthesizing the positive electrode active material, the following can be used.

As the lithium salt, lithium carbonate, lithium hydroxide, lithium nitrate, lithium sulfate, lithium oxide or the like can be used.

As the magnesium salt, magnesium oxide, basic magnesium carbonate, magnesium chloride, magnesium fluoride, magnesium nitrate, magnesium sulfate, magnesium acetate, magnesium oxalate, magnesium sulfide, magnesium hydroxide or the like can be used.

As the cobalt salt, cobalt oxide, cobalt hydroxide or the like can be used.

By mixing the positive electrode active material with a conductive agent, a binder, a dispersion medium and the like, a pasty positive electrode mixture can be obtained.

As the above-mentioned conductive agent, any electronically conductive material that does not tend to cause a chemical reaction in the battery can be used without any particular limitation, and a carbon material is particularly preferable. For example, a carbon black such as acetylene black, ketjen black, channel black, furnace black, lamp black or thermal black, a natural graphite powder such as flake graphite, artificial graphite powder or conductive carbon fibers can be used. These may be used alone, or two or more of these may be used in combination.

The positive electrode used in the present invention contains not more than 3 parts by weight of the conductive agent per 100 parts by weight of the positive electrode active material. By setting the amount of the conductive agent to not more than 3 parts by weight, it is possible to reduce decomposition of the non-aqueous electrolyte on the surface of the conductive agent during high-temperature storage, thereby suppressing a decrease in capacity after high-temperature storage.

Additionally, although the conductive agent has a relatively large surface area, it is possible to reduce the amount of binder for covering the conductive agent by setting the amount of the conductive agent to not more than 3 parts by weight. Accordingly, a sufficient strength can be provided for the electrode plate even when the amount of the binder is not more than 4 parts by weight per 100 parts by weight of the positive electrode active material. Reducing the amount of the insulating binder in this manner improves the load characteristics of the battery, achieving a synergistic effect of improving the cycle characteristics further. However, when the amount of the binder is less than 1 part by weight per 100 parts by weight of the positive electrode active material, it is difficult to provide a sufficient strength for the electrode plate.

As the above-described binder, either a thermoplastic resin or a thermosetting resin may be used, or these may also be used in combination. Among them, polyvinylidene fluoride (PVdF) and polytetrafluoroethylene (PTFE) are preferable, and PVdF is particularly preferable. In particular, the use of PVdF with a molecular weight of not less than 150000 improves the bonding strength, providing a sufficient strength for the electrode plate even when used in a very small amount. In this case, the amount of the insulating binder can be reduced further, which improves the load characteristics of the battery further, achieving a synergistic effect of improving the cycle characteristics even further. On the other hand, when the molecular weight of PVdF is 350000 or more, there is the opposite tendency that the load characteristics are reduced, reducing the cycle characteristics.

As the above-mentioned dispersion medium, an aqueous dispersion medium, or an organic dispersion medium such as N-methyl-2-pyrrolidone or the like can be used.

For the lithium ion secondary battery, it is preferable to use a non-aqueous electrolyte comprising a non-aqueous solvent and a lithium salt dissolved in the non-aqueous solvent. Examples of non-aqueous solvents include: cyclic carbonates such as ethylene carbonate, propylene carbonate, butylene carbonate and vinylene carbonate; non-cyclic carbonates such as dimethyl carbonate, diethyl carbonate, ethyl methyl carbonate and dipropyl carbonate; aliphatic carboxylic acid esters such as methyl formate, methyl acetate, methyl propionate and ethyl propionate; γ-butyrolactone; γ-butyrolactone derivatives such as γ-valerolactone, α-methyl-γ-butyrolactone; non-cyclic ethers such as 1,2-dimethoxyethane; cyclic ethers such as tetrahydrofuran; and aprotic organic solvents such as dimethyl sulfoxide, 1,3-dioxolane, formamide, acetamide, dimethylformamide, dioxolane, acetonitrile, propylnitrile, nitromethane, ethyl monoglyme, phosphoric acid triesters, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, dimethyl sulfoxide and N-methyl-2-pyrrolidone. While these may be used alone, it is preferable to use two or more of these in combination.

It is preferable that the above-described non-aqueous solvent contains γ-butyrolactone and/or a γ-butyrolactone derivative. When the above-described positive electrode active material is used, the amount of gas generated during high-temperature storage tends to increase with commonly used non-aqueous electrolytes containing a cyclic carbonate and a non-cyclic carbonate. Therefore, the above-described positive electrode active material does not have good compatibility with the non-aqueous electrolyte containing a cyclic carbonate and a non-cyclic carbonate. On the other hand, the amount of gas generated during high-temperature storage can be suppressed to a low level in a non-aqueous electrolyte containing γ-butyrolactone or a γ-butyrolactone derivative, even when the above-described positive electrode active material is used. The reason is believed to be that the γ-butyrolactone or γ-butyrolactone derivative forms a film on the surface of the positive electrode, thereby suppressing the gas generation reaction.

The above-described effect can be achieved when the content of γ-butyrolactone and/or a γ-butyrolactone derivative in the non-aqueous solvent is not less than 0.5 wt %. When the above-described content is less than 0.5 wt %, the film cannot be sufficiently formed on the surface of the positive electrode during high-temperature storage, making it impossible to achieve the effect. However, when the above-described content is more than 80 wt %, the ionic conductivity of the non-aqueous electrolyte decreases, reducing the rate characteristics of the battery.

In the present invention, a particularly preferable solvent is a mixed solvent of 0.5 to 70 vol % of γ-butyrolactone, 0.5 to 4 vol % of vinylene carbonate and 10 to 40 vol % of a cyclic carbonate, and 0 to 85 vol % of a non-cyclic carbonate may be further included therein.

Examples of the lithium salt dissolved in the non-aqueous solvent include $LiClO_4$, $LiBF_4$, $LiPF_6$, $LiAlCl_4$, $LiSbF_6$, LiSCN, LiCl, LiCF$_3$SO$_3$, LiCF$_3$CO$_2$, Li(CF$_3$SO$_2$)$_2$, LiAsF$_6$, LiN(CF$_3$SO$_2$)$_2$, LiB$_{10}$Cl$_{10}$, lithium lower aliphatic carboxylates, LiCl, LiBr, LiI and lithium chloroborate. These may be used alone, or two or more of these may be used in combination. Additionally, it is preferable to use at least LiPF$_6$. Although the concentration of the lithium salt in the non-aqueous electrolyte is not particularly limited, it is preferably 0.2 to 2 mol/L, and particularly preferably 0.5 to 1.5 mol/L.

The negative electrode material used in the present invention may be any compound capable of absorbing and desorbing lithium ions, such as a lithium alloy, a carbon material, an inorganic oxide, an inorganic chalcogenide, a nitride, a metal complex or an organic polymer compound. These may be used alone, or two or more of these may be used in combination. Among these negative electrode materials, a carbon material is particularly preferable.

Examples include the combinations of lithium and a carbon material, lithium and an inorganic oxide, as well as the combination of lithium, a carbon material and an inorganic oxide. These negative electrode materials are preferable since they provide high capacity, high discharge electric potential, high safety, high cycle characteristics and the like.

Examples of the above-mentioned lithium alloy include Li—Al, Li—Al—Mn, Li—Al—Mg, Li—Al—Sn, Li—Al—In, Li—Al—Cd, Li—Al—Te, Li—Ga, Li—Cd, Li—In, Li—Pb, Li—Bi and Li—Mg. In this case, it is preferable that the content of lithium is not less than 10 wt %.

Examples of the above-mentioned carbon material include coke, thermally decomposed carbons, natural graphite, artificial graphite, mesocarbon microbeads, graphitized mesophase spherules, gas phase growth carbon, glassy carbons, carbon fibers derived from polyacrylonitrile, pitch, cellulose, or gas phase growth carbon, amorphous carbons and a baked organic matter. These may be used alone, or two or more of these may be used in combination. It should be noted that the carbon material may also contain different elements or compounds such as O, B, P, N, S, SiC and B$_4$C, in addition to carbon. The content of the different element or compound is preferably 0 to 10 wt %.

Examples of the above-mentioned inorganic oxide include titanium oxide, tungsten oxide, molybdenum oxide, niobium oxide, vanadium oxide and iron oxide. Examples of the above-mentioned inorganic chalcogenide include iron sulfide, molybdenum sulfide and titanium sulfide. Examples of the above-mentioned organic polymer compound include polymer compounds such as polythiophene and polyacetylene. Examples of the above-mentioned nitride include cobalt nitride, copper nitride, nickel nitride, iron nitride and manganese nitride.

As the above-described carbon material, a material (hereinafter, referred to as a material X) comprising graphite core particles and amorphous carbon coating at least a part of the surface of the core particles is particularly preferable. Use of this material X allows magnesium leaching from the positive electrode to be captured by the amorphous carbon on the surface, and therefore not to be taken into the graphite layers, making it possible to prevent deterioration of the negative electrode characteristics due to the intercalation of magnesium into graphite layers. This results in an effect of further suppressing a decrease in capacity after high-temperature storage. It is preferable that the material X has a mean particle size of 3 to 20 µm.

By mixing the above-described negative electrode material with a binder, a dispersion medium and the like, a pasty negative electrode mixture can be obtained. As the binder, the dispersion medium and the like, the same or analogous ones used in the production of a positive electrode can be used.

A positive electrode can be produced by applying the positive electrode mixture onto a core material comprising metal foil or the like, and rolling and drying the resulting structure. A negative electrode can be produced by applying the negative electrode mixture onto a core material comprising metal foil or the like, and rolling and drying the resulting structure. When the positive electrode and the negative electrode are in the form of a sheet, it is preferable to provide a layer of the electrode mixture on both sides of the core material. The electrode mixture layer on one side may be formed by a plurality of layers. In addition to the electrode mixture layer, a protective layer containing no active material, an undercoat layer disposed on the core material, an intermediate layer disposed between the electrode mixture layers and the like may also be provided.

In the following, the present invention is described by way of examples with reference to the accompanied drawing.

FIG. 1 shows a structure of the square lithium ion secondary battery produced in the examples. It should be noted that although square batteries were produced in the examples, the battery of the present invention is not limited to this form. The present invention is also applicable to, for example, batteries of a cylindrical, coin, button, sheet, laminated or flat type, or large batteries used for electric vehicles.

EXAMPLE 1

(i) Preparation of Positive Electrode Active Material

An aqueous solution containing cobalt sulfate at a concentration of 0.95 mol/L and magnesium sulfate at a concentration of 0.05 mol/L was continuously supplied to a reaction vessel, while adding sodium hydroxide dropwise into the reaction vessel such that the pH of the solution was 10 to 13, thereby synthesizing a precursor of an active material. Consequently, a hydroxide comprising Co$_{0.95}$Mg$_{0.05}$(OH)$_2$ was obtained.

This precursor and lithium carbonate were mixed such that the molar ratio of lithium, cobalt and magnesium was 1:0.95:0.05, and the mixture was temporarily baked at 600° C. for 10 hours, followed by pulverization. Subsequently, the pulverized baked material was baked again at 900° C. for 10 hours, followed by pulverization and classification, thereby obtaining a positive electrode active material represented by the formula Li(Co$_{0.95}$Mg$_{0.05}$)O$_2$.

(ii) Production of Positive Electrode.

To 100 parts by weight of the obtained positive electrode active material, 1.5 parts by weight of acetylene black were mixed as a conductive agent, and 2 parts by weight in resin content of a N-methyl-2-pyrrolidone solution of polyvinylidene fluoride (PVdF) with a molecular weight of 300000 were further added thereto as a binder, followed by stirring and mixing, thus obtaining a pasty positive electrode mixture. The positive electrode mixture was applied onto both sides of a core material of aluminum foil having a thickness of 15 µm, which was dried, then rolled and cut into a predetermined size, thereby producing a positive electrode.

(iii) Production of Negative Electrode

To 100 parts by weight of flake graphite having a mean particle size of 20 µm, 1 part by weight in resin content of an aqueous solution of carboxymethyl cellulose was mixed as a thickener, and 2 parts by weight of styrene-butadiene rubber were further added thereto as a binder, followed by stirring and mixing to give a pasty negative electrode mixture. The negative electrode mixture was applied onto both sides of a core material of copper foil having a thickness of 10 μm, which was dried, then rolled and cut into a predetermined size, thereby producing a negative electrode.

(iv) Assembly of Battery

The produced positive electrode and negative electrode were wound in the form of a flat spiral, with a microporous polyethylene separator having a thickness of 20 μm disposed therebetween, thereby forming an electrode plate group 1. One end of a positive electrode lead 2 and one end of a negative electrode lead 3 were welded to the positive electrode and the negative electrode, respectively. An insulating ring made of polyethylene resin was mounted on an upper side of the electrode plate group 1, and the whole arrangement was housed in a battery case 4 made of aluminum, as shown in FIG. 1. The insulating ring is not shown in FIG. 1. The other end of the positive electrode lead 2 was spot-welded to a sealing plate 5 made of aluminum. The other end of the negative electrode lead 3 was spot-welded to a lower side of a negative electrode terminal 6 made of nickel located at the center of the sealing plate 5. The opening end of the battery case 4 was laser-welded with the sealing plate 5, and a predetermined amount of a non-aqueous electrolyte was injected from an inlet. Finally, the inlet was closed with a sealing stopper 7 made of aluminum, and laser-welded to the sealing plate 5.

A mixed solvent of ethylene carbonate and ethyl methyl carbonate at a volume ratio of 1:3 with $LiPF_6$ dissolved therein at a concentration of 1.0 mol/L was used as the non-aqueous electrolyte.

The battery thus produced was named a battery 1A of the present invention.

EXAMPLE 2

A battery 2A of the present invention was produced in the same manner as in Example 1, except that the amount of acetylene black serving as the conductive agent of the positive electrode was 3.0 parts by weight per 100 parts by weight of the positive electrode active material.

EXAMPLE 3

A battery 3A of the present invention was produced in the same manner as in Example 1, except that the amount of acetylene black serving as the conductive agent of the positive electrode was 0.05 part by weight per 100 parts by weight of the positive electrode active material.

EXAMPLE 4

A battery 4A of the present invention was produced in the same manner as in Example 1, except that the amount of acetylene black serving as the conductive agent of the positive electrode was 0 part by weight per 100 parts by weight of the positive electrode active material. In other words, the positive electrode of the battery 4A contained no conductive agent.

EXAMPLE 5

A battery 5A of the present invention was produced in the same manner as in Example 1, except that the amount of acetylene black serving as the conductive agent of the positive electrode was 0.1 part by weight per 100 parts by weight of the positive electrode active material.

EXAMPLE 6

A battery 6A of the present invention was produced in the same manner as in Example 1, except that the amount of acetylene black serving as the conductive agent of the positive electrode was 0.5 part by weight per 100 parts by weight of the positive electrode active material.

EXAMPLE 7

A battery 7A of the present invention was produced in the same manner as in Example 1, except that the amount of acetylene black serving as the conductive agent of the positive electrode was 1.0 part by weight per 100 parts by weight of the positive electrode active material.

EXAMPLE 8

In an analogous procedure to Example 1, a hydroxide comprising $Co_{0.97}Mg_{0.03}(OH)_2$ was synthesized as a precursor. A positive electrode active material represented by the formula $Li(Co_{0.97}Mg_{0.03}O_3)O_2$ was obtained by performing the same operations as in Example 1, except that this precursor and lithium carbonate were mixed such that the molar ratio of lithium, cobalt and magnesium was 1:0.97:0.03. Subsequently, a battery 8A of the present invention was produced in the same manner as in Example 1, except for using this positive electrode active material.

EXAMPLE 9

In an analogous procedure to Example 1, a hydroxide comprising $Co_{0.85}Mg_{0.15}(OH)_2$ was synthesized as a precursor. A positive electrode active material represented by the formula $Li(Co_{0.85}Mg_{0.15})O_2$ was obtained by performing the same operations as in Example 1, except that this precursor and lithium carbonate were mixed such that the molar ratio of lithium, cobalt and magnesium was 1:0.85:0.15. Subsequently, a battery 9A of the present invention was produced in the same manner as in Example 1, except for using this positive electrode active material.

EXAMPLE 10

In an analogous procedure to Example 1, a hydroxide comprising $Co_{0.90}Mg_{0.10}(OH)_2$ was synthesized as a precursor. A positive electrode active material represented by the formula $Li(Co_{0.90}Mg_{0.10})O_2$ was obtained by performing the same operations as in Example 1, except that this precursor and lithium carbonate were mixed such that the molar ratio of lithium, cobalt and magnesium was 1:0.9:0.1. Subsequently, a battery 10A of the present invention was produced in the same manner as in Example 1, except for using this positive electrode active material.

EXAMPLE 11

A battery 11A of the present invention was produced in the same manner as in Example 1, except that the amount of PVdF with a molecular weight of 300000 serving as the binder of the positive electrode was 4 parts by weight per 100 parts by weight of the positive electrode active material.

EXAMPLE 12

A battery 12A of the present invention was produced in the same manner as in Example 1, except that the amount of PVdF with a molecular weight of 300000 serving as the binder of the positive electrode was 1 part by weight per 100 parts by weight of the positive electrode active material.

EXAMPLE 13

A battery 13A of the present invention was produced in the same manner as in Example 1, except that the molecular weight of PVdF serving as the binder of the positive electrode was 350000.

EXAMPLE 14

A battery 14A of the present invention was produced in the same manner as in Example 1, except that the molecular weight of PVdF serving as the binder of the positive electrode was 150000.

EXAMPLE 15

In a mixed solvent obtained by mixing ethylene carbonate, ethyl methyl carbonate, γ-butyrolactone and vinylene carbonate at a volume ratio of 20:77.5:0.5:2, $LiPF_6$ was dissolved at a concentration of 1.0 mol/L. A battery 15A of the present invention was produced in the same manner as in Example 1, except for using the resultant non-aqueous electrolyte.

EXAMPLE 16

In a mixed solvent obtained by mixing ethylene carbonate, ethyl methyl carbonate, γ-butyrolactone and vinylene carbonate at a volume ratio of 20:48:30:2, $LiPF_6$ was dissolved at a concentration of 1.0 mol/L. A battery 16A of the present invention was produced in the same manner as in Example 1, except for using the resultant non-aqueous electrolyte.

EXAMPLE 17

In a mixed solvent obtained by mixing ethylene carbonate, ethyl methyl carbonate, γ-butyrolactone and vinylene carbonate at a volume ratio of 20:8:70:2, $LiPF_6$ was dissolved at a concentration of 1.0 mol/L. A battery 17A of the present invention was produced in the same manner as in Example 1, except for using the resultant non-aqueous electrolyte.

EXAMPLE 18

Flake graphite having a mean particle size of 20 μm was mixed with a petroleum pitch, and the mixture was baked at 800° C., thereby coating at least a part of the surface of the flake graphite with amorphous carbon. A battery 18A of the present invention was produced in the same manner as in Example 1, except for using the resulting carbon material (having a mean particle size of 22 μm) in place of flake graphite.

EXAMPLE 19

An aqueous solution containing cobalt sulfate at a concentration of 0.90 mol/L, magnesium sulfate at a concentration of 0.05 mol/L and nickel sulfate at a concentration of 0.05 mol/L was prepared. Using this aqueous solution, a hydroxide comprising $Co_{0.90}Mg_{0.05}Ni_{0.05}(OH)_2$ was synthesized as a precursor, in an analogous procedure to Example 1. A positive electrode active material represented by the formula $Li(Co_{0.90}Mg_{0.05}Ni_{0.05})O_2$ was obtained by performing the same operations as in Example 1, except that this precursor and lithium carbonate were mixed such that the molar ratio of lithium, cobalt, magnesium and nickel was 1:0.90:0.05:0.05. Subsequently, a battery 19A of the present invention was produced in the same manner as in Example 1, except for using this positive electrode active material.

EXAMPLE 20

In an analogous procedure to Example 1, a hydroxide comprising $Co_{0.85}Mg_{0.05}Ni_{0.10}(OH)_2$ was synthesized as a precursor. A positive electrode active material represented by the formula $Li(Co_{0.85}Mg_{0.05}Ni_{0.10})O_2$ was obtained by performing the same operations as in Example 1, except that this precursor and lithium carbonate were mixed such that the molar ratio of lithium, cobalt, magnesium and nickel was 1:0.85:0.05:0.10. Subsequently, a battery 20A of the present invention was produced in the same manner as in Example 1, except for using this positive electrode active material.

EXAMPLE 21

In an analogous procedure to Example 1, a hydroxide comprising $Co_{0.80}Mg_{0.05}Ni_{0.15}(OH)_2$ was synthesized as a precursor. A positive electrode active material represented by the formula $Li(Co_{0.80}Mg_{0.05}Ni_{0.15})O_2$ was obtained by performing the same operations as in Example 1, except that this precursor and lithium carbonate were mixed such that the molar ratio of lithium, cobalt, magnesium and nickel was 1:0.80:0.05:0.15. Subsequently, a battery 21A of the present invention was produced in the same manner as in Example 1, except for using this positive electrode active material.

EXAMPLE 22

In an analogous procedure to Example 1, a hydroxide comprising $Co_{0.70}Mg_{0.05}Ni_{0.25}(OH)_2$ was synthesized as a precursor. A positive electrode active material represented by the formula $Li(Co_{0.70}Mg_{0.05}Ni_{0.25})O_2$ was obtained by performing the same operations as in Example 1, except that this precursor and lithium carbonate were mixed such that the molar ratio of lithium, cobalt, magnesium and nickel was 1:0.70:0.05:0.25. Subsequently, a battery 22A of the present invention was produced in the same manner as in Example 1, except for using this positive electrode active material.

EXAMPLE 23

An aqueous solution containing cobalt sulfate at a concentration of 0.85 mol/L, magnesium sulfate at a concentration of 0.05 mol/L and aluminum sulfate at a concentration of 0.1 mol/L was prepared. Using this aqueous solution, a hydroxide comprising $Co_{0.85}Mg_{0.05}Al_{0.1}(OH)_2$ was synthesized as a precursor, in an analogous procedure to Example 1. A positive electrode active material represented by the formula $Li(Co_{0.85}Mg_{0.05}Al_{0.1})O_2$ was obtained by performing the same operations as in Example 1, except that this precursor and lithium carbonate were mixed such that the molar ratio of lithium, cobalt, magnesium and aluminum was 1:0.85:0.05:0.1. Subsequently, a battery 23A of the present invention was produced in the same manner as in Example 1, except for using this positive electrode active material.

EXAMPLE 24

In an analogous procedure to Example 1, a hydroxide comprising $Co_{0.70}Mg_{0.05}Al_{0.25}(OH)_2$ was synthesized as a precursor. A positive electrode active material represented by the formula $Li(Co_{0.70}Mg_{0.05}Al_{0.25})O_2$ was obtained by performing the same operations as in Example 1, except that this precursor and lithium carbonate were mixed such that the molar ratio of lithium, cobalt, magnesium and aluminum was 1:0.70:0.05:0.25. Subsequently, a battery 24A of the present invention was produced in the same manner as in Example 1, except for using this positive electrode active material.

COMPARATIVE EXAMPLE 1

In an analogous procedure to Example 1, a hydroxide comprising $Co_{0.98}Mg_{0.02}(OH)_2$ was synthesized as a precursor. A positive electrode active material represented by the formula $Li(Co_{0.98}Mg_{0.02})O_2$ was obtained by performing the same operations as in Example 1, except that this precursor and lithium carbonate were mixed such that the molar ratio of lithium, cobalt and magnesium was 1:0.98:0.02. Subsequently, a battery 1B of the comparative example was produced in the same manner as in Example 1, except for using this positive electrode active material.

COMPARATIVE EXAMPLE 2

In an analogous procedure to Example 1, a hydroxide comprising $Co_{0.80}Mg_{0.20}(OH)_2$ was synthesized as a precursor. A positive electrode active material represented by the formula $Li(Co_{0.80}Mg_{0.20})O_2$ was obtained by performing the same operations as in Example 1, except that this precursor and lithium carbonate were mixed such that the molar ratio of lithium, cobalt and magnesium was 1:0.80:0.20. Subsequently, a battery 2B of the comparative example was produced in the same manner as in Example 1, except for using this positive electrode active material.

COMPARATIVE EXAMPLE 3

A battery 3B of the comparative example was produced in the same manner as in Example 1, except for using a magnesium-free positive electrode active material represented by the formula $LiCoO_2$.

COMPARATIVE EXAMPLE 4

A battery 4B of the comparative example was produced in the same manner as in Example 1, except that the amount of acetylene black serving as the conductive agent of the positive electrode was 4.0 parts by weight per 100 parts by weight of the positive electrode active material.

EXAMPLE 25

A battery 25A of the present invention was produced in the same manner as in Example 1, except that the amount of PVdF with a molecular weight of 300000 serving as the binder of the positive electrode was 0.5 part by weight per 100 parts by weight of the positive electrode active material.

EXAMPLE 26

A battery 26A of the present invention was produced in the same manner as in Example 1, except that the amount of PVdF with a molecular weight of 300000 serving as the binder of the positive electrode was 5 parts by weight per 100 parts by weight of the positive electrode active material.

EXAMPLE 27

A battery 27A of the present invention was produced in the same manner as in Example 1, except that the molecular weight of PVdF serving as the binder of the positive electrode was 400000.

EXAMPLE 28

A battery 28A of the present invention was produced in the same manner as in Example 1, except that the molecular weight of PVdF serving as the binder of the positive electrode was 100000.

COMPARATIVE EXAMPLE 5

In an analogous procedure to Example 1, a hydroxide comprising $Co_{0.65}Mg_{0.05}Ni_{0.3}(OH)_2$ was synthesized as a precursor. A positive electrode active material represented by the formula $Li(Co_{0.65}Mg_{0.05}Ni_{0.3})O_2$ was obtained by performing the same operations as in Example 1, except that this precursor and lithium carbonate were mixed such that the molar ratio of lithium, cobalt, magnesium and nickel was 1:0.65:0.05:0.3. Subsequently, a battery 5B of the comparative example was produced in the same manner as in Example 1, except for using this positive electrode active material.

COMPARATIVE EXAMPLE 6

In an analogous procedure to Example 1, a hydroxide comprising $Co_{0.65}Mg_{0.05}Al_{0.3}(OH)_2$ was synthesized as a precursor. A positive electrode active material represented by the formula $Li(Co_{0.65}Mg_{0.05}Al_{0.3})O_2$ was obtained by performing the same operations as in Example 1, except that this precursor and lithium carbonate were mixed such that the molar ratio of lithium, cobalt, magnesium and aluminum was 1:0.65:0.05:0.3. Subsequently, a battery 6B of the comparative example was produced in the same manner as in Example 1, except for using this positive electrode active material.

Evaluation of Batteries

Comparisons were made on the charge/discharge cycle characteristics and the high-temperature storage characteristics of the batteries produced in Examples 1 to 28 and Comparative Examples 1 to 6.

(i) Charge/Discharge Cycle Characteristics

At an ambient temperature of 20° C., each battery was subjected to repeated cycles, in each of which the battery was subjected to a constant voltage charge for two hours under the conditions of a charge voltage of 4.20 V and a maximum charge current of 700 mA and then subjected to a constant current discharge under the conditions of a discharge current of 700 mA and an end of discharge voltage of 3.0 V.

The ratio of the discharge capacity at the 300th cycle is shown as the capacity retention rate A in Tables 1 and 2, with the discharge capacity at the first cycle taken as 100.

(ii) High-temperature Storage Characteristics

At an ambient temperature of 20° C., each battery was subjected to two cycles, in each of which the battery was subjected to a constant voltage charge for two hours under the conditions of a charge voltage of 4.20 V and a maximum charge current of 700 mA and then subjected to a constant current discharge under the conditions of a discharge current of 700 mA and an end of discharge voltage of 3.0 V, and the charge/discharge capacities at the second cycles were determined. Thereafter, the charged battery was stored at 85° C. for three days. Subsequently, the stored battery was again subjected to two charge/discharge cycles at 20° C. under the same conditions as described above, and a capacity retention rate B after high-temperature storage was determined. The ratio of the discharge capacity at the second cycle after high-temperature storage is shown as the capacity retention rate B in Tables 1 and 2, with the discharge capacity before storage taken as 100.

TABLE 1

| Battery no. | Positive electrode active material | Amount of conductive agent (parts by weight) | Amount of binder (parts by weight) | Molecular weight of PVdF | Capacity retention rate (%) A | B |
|---|---|---|---|---|---|---|
| 1A | $LiCo_{0.95}Mg_{0.05}O_2$ | 1.5 | 2 | 300000 | 87 | 85 |
| 2A | $LiCo_{0.95}Mg_{0.05}O_2$ | 3.0 | 2 | 300000 | 89 | 83 |
| 3A | $LiCo_{0.95}Mg_{0.05}O_2$ | 0.05 | 2 | 300000 | 85 | 88 |
| 4A | $LiCo_{0.95}Mg_{0.05}O_2$ | 0 | 2 | 300000 | 81 | 85 |
| 5A | $LiCo_{0.95}Mg_{0.05}O_2$ | 0.1 | 2 | 300000 | 86 | 88 |
| 6A | $LiCo_{0.95}Mg_{0.05}O_2$ | 0.5 | 2 | 300000 | 86 | 87 |
| 7A | $LiCo_{0.95}Mg_{0.05}O_2$ | 1.0 | 2 | 300000 | 87 | 85 |
| 8A | $LiCo_{0.97}Mg_{0.03}O_2$ | 1.5 | 2 | 300000 | 88 | 85 |
| 9A | $LiCo_{0.85}Mg_{0.15}O_2$ | 1.5 | 2 | 300000 | 89 | 83 |
| 10A | $LiCo_{0.90}Mg_{0.10}O_2$ | 1.5 | 2 | 300000 | 86 | 86 |
| 11A | $LiCo_{0.95}Mg_{0.05}O_2$ | 1.5 | 4 | 300000 | 85 | 85 |
| 12A | $LiCo_{0.95}Mg_{0.05}O_2$ | 1.5 | 1 | 300000 | 92 | 85 |
| 13A | $LiCo_{0.95}Mg_{0.05}O_2$ | 1.5 | 2 | 350000 | 89 | 83 |
| 14A | $LiCo_{0.95}Mg_{0.05}O_2$ | 1.5 | 2 | 150000 | 87 | 85 |
| 15A | $LiCo_{0.95}Mg_{0.05}O_2$ | 1.5 | 2 | 300000 | 86 | 90 |
| 16A | $LiCo_{0.95}Mg_{0.05}O_2$ | 1.5 | 2 | 300000 | 84 | 92 |
| 17A | $LiCo_{0.95}Mg_{0.05}O_2$ | 1.5 | 2 | 300000 | 82 | 93 |
| 18A | $LiCo_{0.95}Mg_{0.05}O_2$ | 1.5 | 2 | 300000 | 87 | 91 |
| 19A | $LiCo_{0.90}Mg_{0.05}Ni_{0.05}O_2$ | 1.5 | 2 | 300000 | 86 | 83 |
| 20A | $LiCo_{0.85}Mg_{0.05}Ni_{0.10}O_2$ | 1.5 | 2 | 300000 | 85 | 82 |
| 21A | $LiCo_{0.80}Mg_{0.05}Ni_{0.15}O_2$ | 1.5 | 2 | 300000 | 84 | 81 |
| 22A | $LiCo_{0.70}Mg_{0.05}Ni_{0.25}O_2$ | 1.5 | 2 | 300000 | 81 | 80 |
| 23A | $LiCo_{0.85}Mg_{0.05}Al_{0.1}O_2$ | 1.5 | 2 | 300000 | 89 | 86 |
| 24A | $LiCo_{0.70}Mg_{0.05}Al_{0.25}O_2$ | 1.5 | 2 | 300000 | 90 | 87 |
| 25A | $LiCo_{0.95}Mg_{0.05}O_2$ | 1.5 | 0.5 | 300000 | 80 | 80 |
| 26A | $LiCo_{0.95}Mg_{0.05}O_2$ | 1.5 | 5 | 300000 | 79 | 85 |
| 27A | $LiCo_{0.95}Mg_{0.05}O_2$ | 1.5 | 2 | 400000 | 80 | 84 |
| 28A | $LiCo_{0.95}Mg_{0.05}O_2$ | 1.5 | 2 | 100000 | 80 | 83 |

TABLE 2

| Battery No. | Positive electrode active material | Amount of conductive agent (parts by weight) | Amount of binder (parts by weight) | Molecular weight of PVdF | Capacity retention rate (%) A | B |
|---|---|---|---|---|---|---|
| 1B | $LiCo_{0.98}Mg_{0.02}O_2$ | 1.5 | 2 | 300000 | 69 | 85 |
| 2B | $LiCo_{0.80}Mg_{0.20}O_2$ | 1.5 | 2 | 300000 | 87 | 69 |
| 3B | $LiCoO_2$ | 1.5 | 2 | 300000 | 69 | 86 |
| 4B | $LiCo_{0.95}Mg_{0.05}O_2$ | 4.0 | 2 | 300000 | 87 | 68 |
| 5B | $LiCo_{0.65}Mg_{0.05}Ni_{0.3}O_2$ | 1.5 | 2 | 300000 | 79 | 69 |
| 6B | $LiCo_{0.65}Mg_{0.05}Al_{0.3}O_2$ | 1.5 | 2 | 300000 | 90 | 85 |

In Tables 1 and 2, comparisons of the characteristics of the batteries of Examples 1 to 10 with those of the batteries of Comparative Examples 1 to 4 demonstrate that both the cycle characteristics and the high-temperature storage characteristics are improved by using the positive electrode that employs the positive electrode active material in which magnesium is added and the amount of the conductive agent is not more than 3 wt % with respect to the positive electrode active material.

The battery 1B of Comparative Example 1, in which the added amount of magnesium was too small, merely yielded cycle characteristics (capacity retention rate A) equal to those of the battery 3B of Comparative Example 3, in which no magnesium was added. On the other hand, the battery 2B of Comparative Example 2, in which the added amount of magnesium was too large, had a low initial capacity and a capacity retention rate B after high-temperature storage as low as 69%.

Superior characteristics were achieved when the amount of the conductive agent was not more than 3 wt % with respect to the positive electrode active material, and the battery 4B of Comparative Example 4, in which it was 4 wt %, had high-temperature storage characteristics as low as 68%.

A comparison of the batteries of Examples 1, 11 and 12 with the batteries of Examples 25 and 26 shows that both the cycle characteristics and the high-temperature storage characteristics are improved by setting the amount of the binder contained in the positive electrode to 1 to 4 wt % with respect to the positive electrode active material.

The battery 25A of Example 25, in which the amount of the binder was too small, showed a tendency to decrease in electrode plate strength and had cycle characteristics of 80%. On the other hand, the battery 26A of Example 26, in which the amount of binder was too large, showed a tendency to decrease in load characteristics and had cycle characteristics of 79%.

A comparison of the characteristics of the batteries of Examples 1, 13 and 14 with those of the batteries of Comparative Examples 7 and 8 demonstrates that both the cycle characteristics and the high-temperature storage characteristics are improved by setting the molecular weight of PVdF as the binder contained in the positive electrode to 150000 to 350000.

The battery 27A of Example 27 in which the molecular weight of the binder was too high had a tendency to decrease in the load characteristics and also in the cycle characteristics. The battery 28A of Example 28, in which that molecular weight was too low, had a tendency to decrease in electrode plate strength and in the cycle characteristics.

Since the battery 15A of the present invention used the mixed solvent obtained by mixing ethylene carbonate, ethyl methyl carbonate, γ-butyrolactone and vinylene carbonate at a volume ratio of 20:77.5:0.5:2 in the non-aqueous solvent, the capacity retention rate A during the repeated charge and discharge was slightly inferior to that of the battery 1A; however, the capacity retention rate B after high-temperature storage was excellent. Presumably, the reason was that the gas generation was reduced during storage.

In addition, since the battery 17A of the present invention used the mixed solvent obtained by mixing ethylene carbonate, ethyl methyl carbonate, γ-butyrolactone and vinylene carbonate at a volume ratio of 20:8:70:2 in the non-aqueous solvent, the capacity retention rate A during the repeated charge and discharge decreased further; however, the capacity retention rate B after high-temperature storage was very excellent.

From the above, it was found that the capacity retention rate during high-temperature storage could be improved when the non-aqueous solvent contained γ-butyrolactone.

Since the battery 18A of the present invention used the flake graphite whose surface was coated with amorphous carbon in the negative electrode, the high-temperature storage characteristics was superior to those of the battery 1A of the present invention that merely used flake graphite. Presumably, this was because coating the surface of the graphite suppressed the activity on the graphite surface, leading to improved storage characteristics.

Since the batteries 19A to 22A of the present invention use the positive electrode active material to which nickel was added, the cost for the starting materials could be reduced. Moreover, it was found that they had characteristics similar to those of the battery 1A of Example 1 in which no nickel was added to the positive electrode active material and therefore were sufficiently usable.

By comparison with the battery 5B of Comparative Example 5, it can be said that the optimum range of the added amount of nickel is 10 to 25 mol % with respect to the total amount of cobalt, magnesium and nickel.

Since the batteries 23A and 24A of the present invention use the positive electrode active material to which aluminum was added, the capacity of the active material itself decreased and therefore the battery capacity of the battery 23A decreased by 5% in comparison with that of Example 1. On the other hand, however, both the capacity retention rate A and the capacity retention rate B were improved.

However, when aluminum was added in an amount as great as 30 mol % with respect to the total amount of cobalt, magnesium and aluminum as in the case of battery 6B of Comparative Example 6, the battery capacity decreased by as much as 15%, making it impossible to achieve sufficient characteristics. Therefore, it can be said that the optimum range of the added amount of aluminum is not more than 25 mol % with respect to the total amount of cobalt, magnesium and aluminum.

INDUSTRIAL APPLICABILITY

According to the present invention, a decrease in capacity of a lithium ion secondary battery is suppressed during charge/discharge cycles, and a decrease in capacity is also reduced during high-temperature storage. Therefore, according to the present invention, it is possible to provide a highly reliable lithium ion secondary battery.

The invention claimed is:

1. A lithium ion secondary battery comprising a positive electrode, a negative electrode and a non-aqueous electrolyte,
wherein said positive electrode comprises a positive electrode active material, a conductive agent and a binder,
said positive electrode active material comprises a lithium-containing composite oxide represented by the formula $Li_a(Co_{1-x-y}Mg_xM_y)_bO_c$, where M is at least one selected from Ni and Al, $0 \leq a \leq 1.05$, $0.03 \leq x \leq 0.15$, $0 \leq y \leq 0.25$, $0.85 \leq b \leq 1.1$ and $1.8 \leq c \leq 2.1$, and
an amount of said conductive agent contained in said positive electrode is not more than 3.0 parts by weight per 100 parts by weight of said positive electrode active material.

2. The lithium ion secondary battery in accordance with claim 1,
wherein an amount of said binder contained in said positive electrode is not less than 1.0 part by weight and not more than 4.0 parts by weight per 100 parts by weight of said positive electrode active material.

3. The lithium ion secondary battery in accordance with claim 1,
wherein said binder comprises polyvinylidene fluoride, and a weight-average molecular weight of said polyvinylidene fluoride is not less than 150000 and not more than 350000.

4. The lithium ion secondary battery in accordance with claim 1,
wherein said non-aqueous electrolyte comprises a non-aqueous solvent and a lithium salt dissolved in said non-aqueous solvent, and said non-aqueous solvent contains γ-butyrolactone and/or a γ-butyrolactone derivative.

5. The lithium ion secondary battery in accordance with claim 1,
wherein said negative electrode contains a material comprising core particles and amorphous carbon coating at least a portion of a surface of said core particles, and said core particles comprise graphite.

* * * * *

UNITED STATES PATENT AND TRADEMARK OFFICE
CERTIFICATE OF CORRECTION

PATENT NO. : 7,150,940 B2 Page 1 of 1
APPLICATION NO. : 10/469134
DATED : December 19, 2006
INVENTOR(S) : Masaya Okochi et al.

It is certified that error appears in the above-identified patent and that said Letters Patent is hereby corrected as shown below:

On the title page

Item 75 Inventors:, change:

"Masatoshi Nagayama, Hirakata (JP);" to -- Masatoshi Nagayama, Osaka (JP); --
"Yutaka Kawatate, Hirakata (JP);" to -- Yutaka Kawatate, Osaka (JP); --
"Ryoichi Tanaka, Izumiotsu (JP);" to -- Ryoichi Tanaka, Osaka (JP); --
"Hideya Asano, Hirakata (JP);" to -- Hideya Asano, Osaka (JP); --

On The Title Page, Item -56- References Cited, FOREIGN PATENT DOCUMENTS, change:

"JP 9-168722 6/1994" to -- JP 6-168722 6/1994 --

Signed and Sealed this

Nineteenth Day of June, 2007

JON W. DUDAS
*Director of the United States Patent and Trademark Office*